United States Patent Office 3,842,117
Patented Oct. 15, 1974

3,842,117
15-OXOPROST-13-ENOIC ACID DERIVATIVES
Kiyoshi Sakai, Takashi Yusa, Masaaki Sasaki, Shigeo Amemiya, Mitsuo Yamazaki, and Koichi Kojima, Tokyo, Japan, assignors to Sankyo Company Limited, Tokyo, Japan
No Drawing. Continuation of abandoned application Ser. No. 181,242, Sept. 16, 1971. This application Apr. 3, 1973, Ser. No. 347,576
Claims priority, application Japan, Sept. 19, 1970, 45/82,238; Sept. 28, 1970, 45/84,800
Int. Cl. C07c 61/36, 69/74
U.S. Cl. 260—468 D    5 Claims

ABSTRACT OF THE DISCLOSURE

Novel 15-oxoprost-13-enoic acid derivatives having the formula

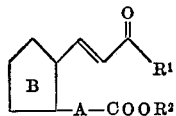

wherein A represents a straight or branched alkylene group having from 1 to 10 carbon atoms, $R^1$ represents a straight or branched alkly group having from 1 to 10 carbon atoms, $R^2$ represents hydrogen atom or a straight or branched alkyl group having from 1 to 5 carbon atoms and the formula

represents a cyclopentylene or cyclopentenylene group selected from the formula

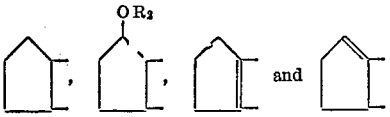

wherein $R^3$ represents hydrogen atom or tetrahydropyranyl group.

The products are useful as a suppressant of uterine contraction in pregnant women and as an intermediate for the corresponding 15-hydroxyprost-13-enoic acid which exhibits a uterine contraction activity and inhibits an activity of 15-hydroxyprostaglandin dehydrogenase. The products are prepared by reacting a 1-formylcyclopentane- or 1-formylcyclopentene derivative having the formula

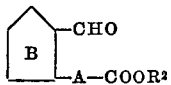

wherein $R^2$, A and the formula

are as defined above with a phosphoran compound having the formula

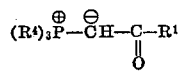

wherein $R^1$ is as defined above and $R^4$ represents a hydrocarbon group.

---

This is a continuation of application Ser. No. 181,242, filed Sept. 16, 1971, now abandoned.

This invention relates to a novel 15-oxoprost-13-enoic acid derivatives and a process for the preparation thereof.
More particularly, it relates to 15-oxoprost-13-enoic acid derivatives having the formula

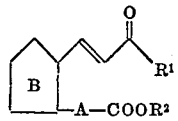 (I)

wherein A represents a straight or branched alkylene group having from 1 to 10 carbon atoms, preferably from 4 to 8 carbon atoms, $R^1$ represents a straight or branched alkyl group having from 1 to 10 carbon atoms, preferably from 3 to 7 carbon atoms, $R^2$ represents hydrogen atom or a straight or branched alkyl group having from 1 to 5 carbon atoms and the formula

represents a cyclopentylene or cyclopentenylene group selected from the formula

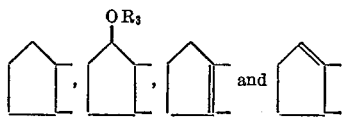

wherein $R^3$ represents hydrogen atom or tetrahydropyranyl group and a process for the preparation thereof.

As a result of various investigations, we have unexpectedly found that the present compounds (I) exhibit a suppression activity of uterine contraction. For example, spontaneous uterine contraction in termed pregnant rat was suppressed for about 15 minutes by intraveneous administration of 4 mg./kg. of 15-oxoprost-13-enoic acid. The present compound (I) is therefore useful as a suppressant of uterine contraction in pregnant women. For example, it is useful in treating threatened abortion in pregnant women. This compound may be formulated with suitable excipients for administration by injection. From about 50 mg. to about 500 mg. of this compound can be administered daily to the pregnant women in divided doses. Furthermore, it has been unxpectedly found that the activities of prostaglandin dehydrogenase are hindered by the novel 15-hydroxyprost-13-enoic acid derivatives having the formula

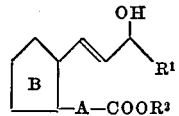 (II)

wherein $R^1$, $R^2$, A and the formula

are as defined above which may be prepared by reducing the 15-oxoprost-13-enoic acid derivatives (I) with a metal hydride complex, e.g. sodium boron hydride.

For example, 50% inhibition concentration of 15-hydroxyprost-13-enoic acid for 15-hydroxyprostaglandin dehydrogenase is $0.4 \times 10^{-5}$ M [tested by the method reported by E. Änggård and B. Samuelsson in Arkiv För Kemi, 25, 293 (1966)].

Furthermore, it has been found that the compounds having the above formula (II) in which the formula

represents

exhibit uterine contraction activity selectively. For example, termed pregnant rat uterus is contracted by 1.8 mg./kg. of 15-hydroxyprost-13-enoic acid and 6 μg./kg. of prostaglandin $E_1$, respectively (tested by the Magnus technique).

The compounds (II) are usually administered together with known prostaglandins in a molar ratio of 200–500:1 by intravenous injection in order to prolong the activities of prostaglandins. When they are used as an uterine contraction agent, the parenteral total daily dosage for termed pregnant women is of about 50–130 mg.

According to the process of the present invention, the 15-oxoprost-13-enoic acid derivatives (I) are prepared by reacting a 1-formylcyclopentane- or 1-formylcyclopentene derivative having the formula

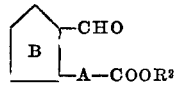 (III)

wherein $R^2$, A and the formula

are as defined above with a phosphoran compound having the formula

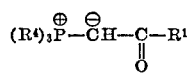 (IV)

wherein $R^1$ is as defined above and $R^4$ represents a hydrocarbon group and, if desired, hydrolyzing the reaction product.

The process of the present invention is preferably carried out by contacting the 1-formylcyclopentane- or 1-formylcyclopentene derivatives (III) with the phosphoran compound (IV) in a molar ratio of 1:about 1~10 in the presence of an inert organic solvent. The compound (IV) is often referred to as "Wittig reagent" and the group $R^4$ in the formula (IV) is preferably an aryl group, e.g., phenyl or an alkyl group having 1~6 carbon atoms, e.g., methyl, ethyl and n-butyl. As a solvent, there may be employed any inert organic solvent without limitation that would be usually employed in a Wittig reaction. Examples of such a solvent include ethers, e.g., diethyl ether, tetrahydrofuran and dioxane; hydrocarbons, e.g., benzene, toluene and hexane; dialkyl sulfoxide, e.g., dimethyl sulfoxide; and halogenohydrocarbons, e.g., dichloromethane and chloroform. The reaction temperature is not critical and the reaction is usually carried out at from 0° C. to a reflux temperature of the solvent employed. The reaction period is varied mainly depending upon the reaction temperature and a kind of the reactant. It is usually from several hours to several days.

After completion of the reaction, the reaction product is separated from the reaction mixture by a conventional means. For instance, the desired product is separated by distillating off the solvent from the reaction mixture. The crude product thus obtained is, if necessary, further purified by a conventional means, for example, column chromatography and thin layer chromatography.

When the group $R^3$ in the formula (I) is tetrahydropyranyl group, the group may be, if desired, eliminated by treating the compound (I) with a weakly acidic solution.

As the acidic solution, there may be employed an organic acid solution such as formic acid-, acetic acid-, propionic acid-, butyric acid-, oxalic acid-, malonic acid solution and a dilute inorganic acid solution such as a dilute hydrochloric acid solution and a dilute sulfuric acid solution. As the solvent, there may be employed an inert solvent such as water, alcohols; e.g., methanol and ethanol, ethers, e.g., tetrahydrofuran and dioxane and a mixture of water and said organic solvent.

The reaction temperature is not critical and the reaction is usually carried out within a range of from room temperature to reflux temperature of a solvent employed.

The reaction period is varied mainly depending upon the reaction temperature and a kind of the reactant. The reaction is usually completed within ten hours. After completion of the reaction, the reaction product is separated from the reaction mixture by a conventional means. For instance, the reaction mixture is extracted with a suitable solvent and the extract is washed with water and dried and the solvent is distilled off. The crude product is, if necessary, further purified by a conventional means, for example, column chromatography and thin layer chromatography. When the elimination step is carried out in a strong acidic condition, a dehydration reaction occurs as well as the elimination reaction.

The ester compounds having the formula (I) wherein $R^2$ is an alkyl group are, if desired, hydrolyzed with a conventional means to give the carboxylic acid compounds having the formula (I) wherein $R^2$ is hydrogen atom. For instance, the ester compounds are treated with a mineral acid, for example, hydrochloric acid, hydrobromic acid and sulfuric acid or an alkali- or alkaline earth metal hydroxide, for example, sodium hydroxide, potassium hydroxide and barium hydroxide in the presence of water or aqueous alcohols, e.g., aqueous methanol and aqueous ethanol or aqueous ethers, e.g., aqueous tetrahydrofuran and aqueous dioxane.

The compounds (III) employed as a starting material are novel and prepared according to the following reaction sequence;

(1) Preparation of 1-hydroxy-2-formyl-3-(6-carboxylhexyl)cyclopentane

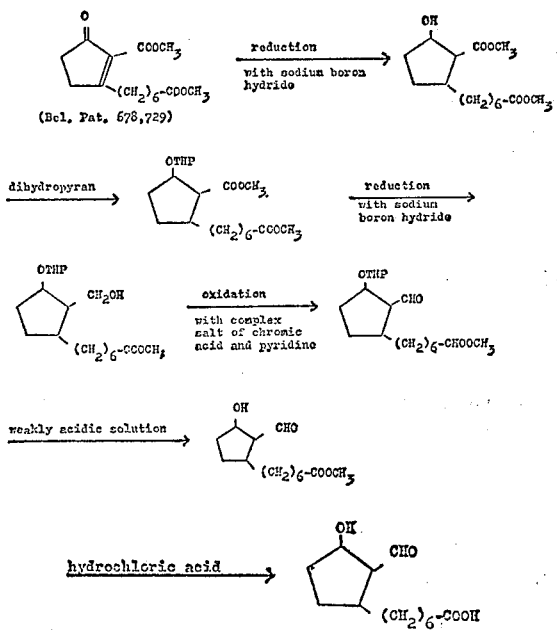

wherein THP represents 2-tetrahydropyranyl group.

(2) Preparation of 1-formyl-2-(6-carboxylhexyl)cyclopentane, 1 - formyl-2-(6-carboxylhexyl)cyclopent-5-en and 1-formyl-2-(6-carboxylhexyl)cyclopent-1-en

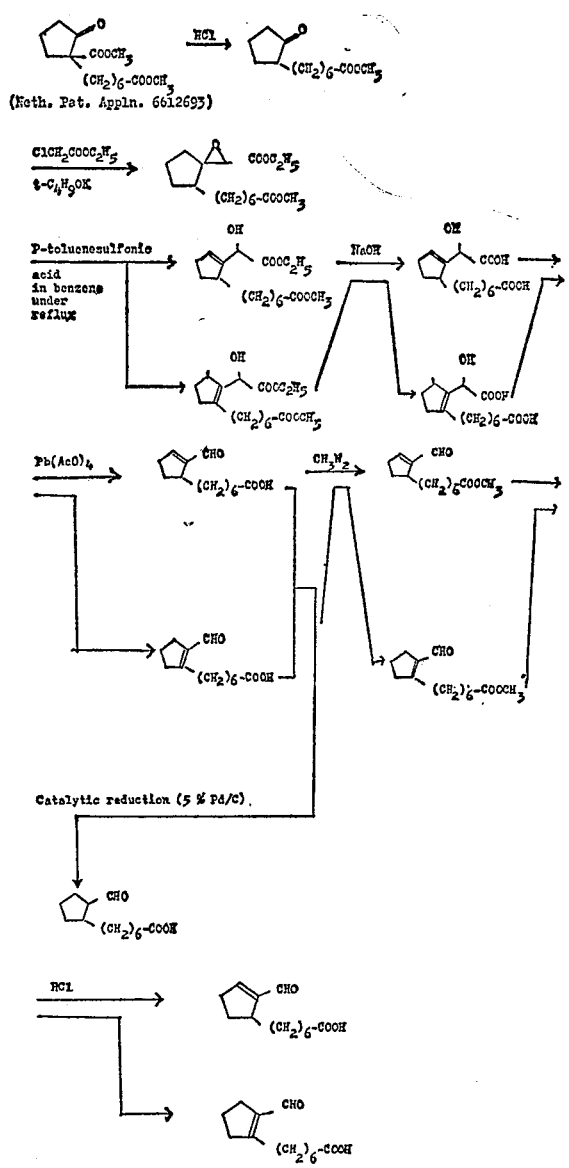

The following examples are presented to further illustrate the present invention.

EXAMPLE 1

15-Oxoprost-13-enoic acid

In 20 ml. of ether is dissolved 500 mg. of 1-formyl-2-(6-carboxylhexyl) cyclopentane and to the solution is added 900 mg. of 2 - oxoheptylidenetributylphosphoran. The mixture is stirred at room temperature for 24 hours. After completion of the reaction, the solvent is distilled off from the reaction mixture and the residue is chromatographed on 15 g. of silica gel and eluted with benzene for a while and next with benzene containing 5% ether. The eluates with the latter solvent are collected and the solvent is distilled off to give 490 mg. of the pure desired product (I.R. liquid film) $\nu_{max.}^{cm.^{-1}}$: 3200, 1710, 1670, 1630.

UV $\lambda_{max.}^{Ethanol}$ 231 m$\mu$ ($\epsilon$ = 15,700).

Mass spectrum M$^{\oplus}$: 322 ($C_{20}H_{34}O_3$)

EXAMPLE 2

Methyl 15-oxoprost-13-enoate and 15-oxoprost-13-enoic acid (1) In 300 ml. of carbon tetrachloride is dissolved 1.1 g. of 1-formyl-2-(6-methoxycarbonylhexyl) cyclopentane and to the solution is added 17.3 g. of 2-oxoheptylidenetriphenylphosphoran. The mixture is heated under reflux for 8 hours. After completion of the reaction, the solvent is distilled off and the residue is chromatographed on 30 g. of silica gel and eluted with benzene for a while and next with benzene containing 2% ether. The eluates with the latter solvent are collected and the solvent is distilled off to give 1.42 g. of methyl 15-oxoprost-13-enoate.

I.R. (liquid film) $\nu_{max.}^{cm.^{-1}}$: 1740, 1626, 1670, 1693.

UV $\lambda_{max.}^{Ethanol}$ 230 m$\mu$ ($\epsilon$ = 14,500)

Mass spectrum M$^{\oplus}$: 336 ($C_{21}H_{36}O_3$)

N.M.R. (CDCl$_3$) $\delta$: p.p.m.

3.66 (3H, singlet, —COOC$\underline{H_3}$)

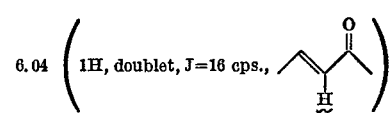

6.04 (1H, doublet, J=16 cps., 6.72 (1H, quartette, J=4.16 cps., (2) In 40 ml. of methanol is dissolved 500 mg. of the methyl 15-oxoprost-13-enoate obtained above and to the solution is added dropwise 100 mg. of sodium hydroxide in 2 ml. of water.

The mixture is stirred at room temperature for 8 hours. After completion of the reaction, the reaction mixture is neutralized by addition of dilute aqueous hydrochloric acid. The mixture is extracted with ether and the extract is washed with water and dried over anhydrous sodium sulfate. The solvent is distilled off to give 450 mg. of an oily substance. The oil is chromatographed on 10 g. of silica gel and eluted with benzene for a while and next with benzene containing 3% ether. The eluates with the latter solvent are collected and the solvent is distilled off to give 430 mg. of 15-oxoprost-13-enoic acid.

The infrared absorption spectrum, ultraviolet spectrum and mass spectrum of said compound are the same as in Example 1, respectively.

EXAMPLE 3

Methyl 15-oxoprost-11,13-dienoate

In 150 ml. of carbon tetrachloride is dissolved 520 mg. of 1-formyl-2-(6-methoxycarbonylhexyl) cyclopent-5-ene and to the mixture is added 8.2 g. of 2-oxoheptylidenetriphenylphosphoran. The mixture is heated under reflux for 24 hours. After completion of the reaction, the solvent is distilled off and the residue is chromatographed on 60 g. of silica gel and eluted with benzene and next with benzene containing 5% ether. The eluates with the latter solvent are collected and the solvent is distilled off to give 820 mg. of the pure desired product.

I.R. (liquid film) $\nu_{max.}^{cm.^{-1}}$: 1740, 1690, 1665, 1615, 1590.

UV $\lambda_{max.}^{Ethanol}$ 289 m$\mu$ ($\epsilon$ = 19,000)

Mass spectrum M$^{\oplus}$: 334 ($C_{21}H_{34}O_3$)

N.M.R. (CDCl$_3$) $\delta$: p.p.m.

3.68 (3H, singlet, —COOC$\underline{H_3}$)

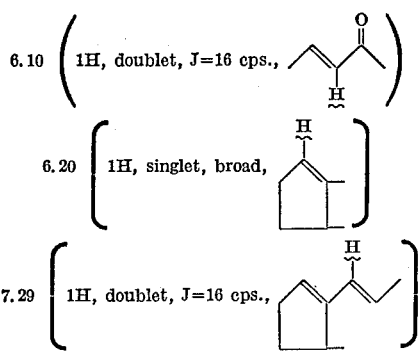

EXAMPLE 4

Methyl 15-oxoprost-8 (12),13-dienoate

In 15 ml. of ether is dissolved 500 mg. of 1-formyl-2-(6-methoxycarbonylhexyl) cyclopent-1-ene and to the mixture is added 800 mg. of 2-oxoheptylidenetriphenylphosphoran. The mixture is stirred at room temperature for 24 hours. After completion of the reaction, the solvent is distilled off and the residue is chromatographed on 15 g. of silica gel and eluted with benzene for a while and next with benzene containing 3% ether. The eluates with the latter solvent are collected and the solvent is distilled off to give 610 mg. of the pure desired product.

I.R. (liquid film) $\nu_{max.}^{cm.^{-1}}$: 1745, 1685, 1662, 1625, 1590.

UV $\lambda_{max.}^{Ethanol}$ 302 m$\mu$ ($\epsilon$=9,250)

Mass spectrum M$^{\oplus}$: 334 ($C_{21}H_{34}O_3$)

N.M.R. (CDCl$_3$) $\delta$: p.p.m.

3.68 (3H, singlet, —COOC$\underline{H}_3$)

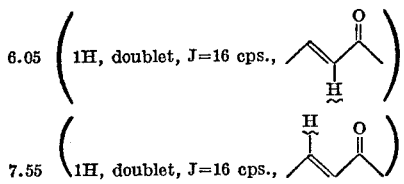

EXAMPLE 5

Methyl 11-(2-tetrahydropyranyloxy)-15-oxoprost-13-enoate

In 10 ml. of ether is dissolved 650 mg. of 1-(2-tetrahydropyranyloxy) - 2 - formyl - 3 - (6-methoxycarbonylhexyl)cyclopentane and to the mixture is added 820 mg. of 2 - oxoheptylidenetributylphosphoran. The mixture is stirred at room temperature for 4.5 hours. After completion of the reaction, the solvent is distilled off. The residue is allowed to stand overnight under cooling, chromatographed on 16 g. of silica gel and eluted with hexane for a while and next with hexane containing 80% benzene and with benzene containing 2% ether successively. The eluates with the hexane containing benzene and with the benzene containing ether are collected. The solvent is distilled off to give 614 mg. of the pure desired product.

I.R. (liquid film) $\nu_{max.}^{cm.^{-1}}$ 1632, 1680, 1700, 1746.

N.M.R. (CDCl$_3$) $\tau$: p.p.m.

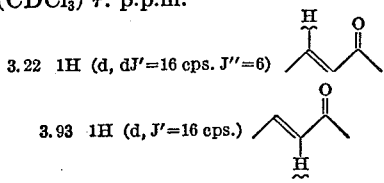

Mass spectrum M$^{\oplus}$: 436 ($C_{26}H_{44}O_5$)

UV $\lambda_{max.}^{Ethanol}$ 226.5 m$\mu$ ($\epsilon$=13,000)

EXAMPLE 6

Methyl 11-hydroxy-15-oxoport-13-enoate

In a mixture of 8 ml. of acetic acid. 4 ml. of water and 7 ml. of tetrahydrofuran is dissolved 150 mg. of methyl 11-(2-tetrahydropyranyloxy)-15-oxoprost-13-enoate and the mixture is stirred at 55~60° C. for 5 hours. After completion of the reaction, water is added to the reaction mixture and the mixture is extracted with ether. The extract is washed with aqueous sodium bicarbonate and water successively and dried over anhydrous sodium sulfate. The solvent is distilled off and the residue is chromatographed on 3 g. of silica gel and eluted with benzene for a while and next with benzene containing 3% ether. The eluates with the latter solvent are collected and the solvent is distilled off to give 57 mg. of the pure product.

I.R. (liquid film) $\nu_{max.}^{cm.^{-1}}$: 3450.

N.M.R. (CDCl$_3$) $\tau$: p.p.m.

6.32 3H (S) —COOC$\underline{H}_3$

Mass spectrum M$^{\oplus}$: 352 ($C_{21}H_{36}O_4$)

UV $\lambda_{max.}^{Ethanol}$ 225 m$\mu$ ($\epsilon$=12,000)

EXAMPLE 7

11-Hydroxy-15-oxoprost-13-enoic acid

In a mixture of 25 ml. of tetrahydrofuran, 8 ml. of water and 400 mg. of potassium hydroxide is dissolved 230 mg. of methyl 11-hydroxy-15-oxoprost-13-enoate and the solution is stirred at room temperature overnight. After completion of the reaction, water and acetic acid are added to the reaction mixture and the mixture is extracted with chloroform. The extract is washed with water and dried over anhydrous sodium sulfate. The solvent is distilled off and the residue is chromatographed on silica gel and eluted with benzene for a while and next with benzene containing 25~50% ether successively. The eluates with the latter solvent are collected and the solvent is distilled off to give 89 mg. of the pure desired product.

I.R. (liquid film) $\nu_{max.}^{cm.^{-1}}$: 1700, 3400.

UV $\lambda_{max.}^{Ethanol}$ 221 m$\mu$ ($\epsilon$=11,000)

Mass spectrum M$^{\oplus}$: 338 ($C_{20}H_{34}O_4$)

EXAMPLE 8

11-(2-Tetrahydropyanyloxy)-15-oxoprost-13-enoic acid

In 5 ml. of ether is dissolved 150 mg. of 1-(2-tetrahydropyranyloxy)-2-formyl-3-(6 - carboxylhexyl) cyclopentane and and to the solution is added 210 mg. of 2-oxoheptylidenetributylphosphoran. The mixture is stirred at room temperature for 5 hours. After completion of the reaction, the solvent is distilled off and the residue is chromatographed on 3 g. of silica gel and eluted with benzene for a while and next with benzene containing 3~30% ether successively. The eluates with the latter solvent are collected and the solvent is distilled off to give 87 mg. of the pure desired product.

I.R. (liquid film) $\nu_{max.}^{cm.^{-1}}$: 1700.

Mass spectrum M$^{\oplus}$: 422 ($C_{25}H_{42}O_5$)

UV $\lambda_{max.}^{Ethanol}$ 225 m$\mu$ ($\epsilon$=12,000).

EXAMPLE 9

11-Hydroxy-15-oxoprost-13-enoic acid

In a mixture of 8 ml. of acetic acid, 4 ml. of water and 7 ml. of tetrahydrofuran is dissolved 150 mg. of 11-(2-tetrahydropyranyl)-15-oxoprost-13-enoic acid and the solution is stirred at 55~60° C. for 5 hours. After completion of the reaction, water is added to the reaction solvent and the mixture is extracted with ether. The extract is washed with aqueous sodium bicarbonate and water successively and dried over anhydrous sodium sulfate. The solvent is distilled off and the residue is chromatographed on 2.5 g. of silica gel and eluted with benzene for a while and next with benzene containing 25~50% ether successively. The eluates with the latter solvent are collected and the solvent is distilled off to give 32 mg. of the pure desired product.

I.R. (liquid film) $\nu_{max.}^{cm.^{-1}}$: 1700, 3400.

$UV_{max.}^{Ethanol}$ 221 m$\mu$ ($\epsilon = 11,000$)

Mass spectrum M$^{\oplus}$: 338 ($C_{20}H_{34}O_4$)

What is claimed is:
1. A compound having the formula

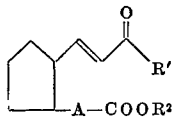

wherein A represents a straight or branched alkylene group having from 4 to 8 carbon atoms, R' represents a straight or branched alkyl group having from 3 to 7 carbon atoms, and R$^2$ represents a hydrogen atom or a straight or branched alkyl group having from 1 to 5 carbon atoms.

2. A compound of Claim 1, wherein A is $(CH_2)_6$.
3. A compound of Claim 2, wherein R' is $-C_5H_{11}$.
4. A compound of Claim 1 comprising 15-oxoprost-13-enoic acid.
5. A compound of Claim 1 comprising methyl 15-oxoprost-13-enoate.

References Cited
UNITED STATES PATENTS 3,538,120  11/1970  Finch _____ 260—345.8

ROBERT GERSTL, Primary Examiner

U.S. Cl. X.R.

260—345.7, 345.8, 348 A, 410.9 R, 413, 468 K, 514 D, 514 K; 424—305, 317